United States Patent [19]

Carpenter et al.

[11] Patent Number: 5,203,898
[45] Date of Patent: Apr. 20, 1993

[54] METHOD OF MAKING FLUORINE/BORON DOPED SILICA TUBES

[75] Inventors: Norman W. Carpenter, Woodhull; Alan J. Morrow, Elmira; Donald R. Young, Jr., Corning, all of N.Y.

[73] Assignee: Corning Incorporated, Corning, N.Y.

[21] Appl. No.: 809,697

[22] Filed: Dec. 16, 1991

[51] Int. Cl.$^5$ .................. C03B 37/10; C03B 37/023
[52] U.S. Cl. ............... 65/3.12; 65/DIG. 16; 65/110; 427/163
[58] Field of Search ............... 65/3.12, 3.11, DIG. 16, 65/110; 427/163

[56] References Cited

U.S. PATENT DOCUMENTS

| | | | |
|---|---|---|---|
| 4,165,223 | 8/1979 | Powers | 65/2 |
| 4,620,861 | 11/1986 | Berkey | 65/3.12 |
| 4,931,076 | 5/1990 | Berkey | 65/4.2 |
| 4,979,972 | 12/1990 | Berkey | 65/4.2 |
| 5,011,251 | 4/1991 | Miller . | |

FOREIGN PATENT DOCUMENTS

| | | | |
|---|---|---|---|
| 1162948 | 2/1984 | Canada | 65/DIG. 16 |
| 59-092936 | 5/1984 | Japan | 65/DIG. 16 |
| 2038311 | 7/1980 | United Kingdom | 65/DIG. 16 |

Primary Examiner—Robert L. Lindsay
Attorney, Agent, or Firm—William J. Simmons, Jr.

[57] ABSTRACT

Disclosed is a method of forming a glass tube doped with boron and fluorine. A $B_2O_3$-doped tubular porous preform is heated, and a fluorine-containing gas is flowed into its aperture. The temperature is sufficiently high to cause the fluorine-containing gas to decompose and form fluorine which dopes the preform. Also flowed into the aperture is a sufficient amount of $BF_3$ to prevent fluorine from reacting with the $B_2O_3$ in the porous preform and forming a $B_2O_3$-depleted region near the aperture surface. The particles are then fused to form a fluorine-containing dense glass tube.

14 Claims, 2 Drawing Sheets

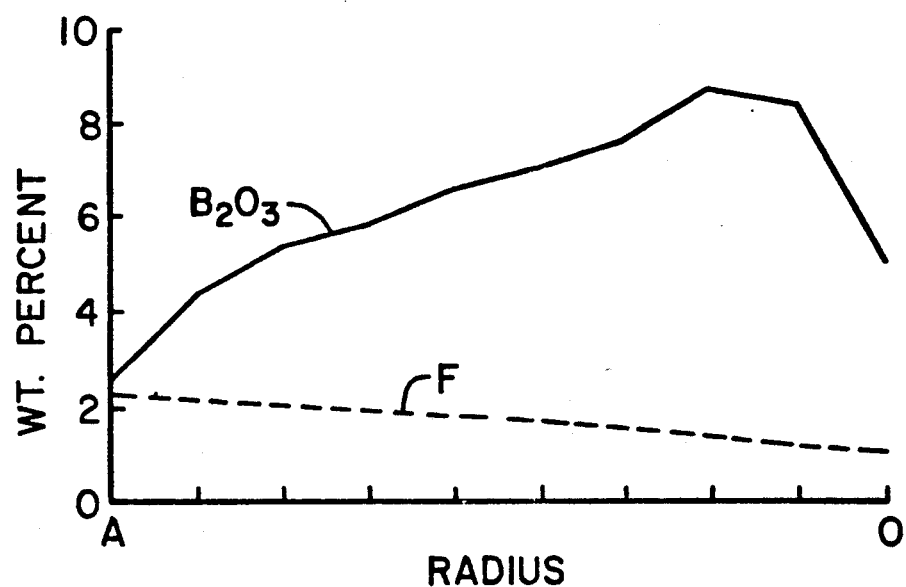
Fig. 1
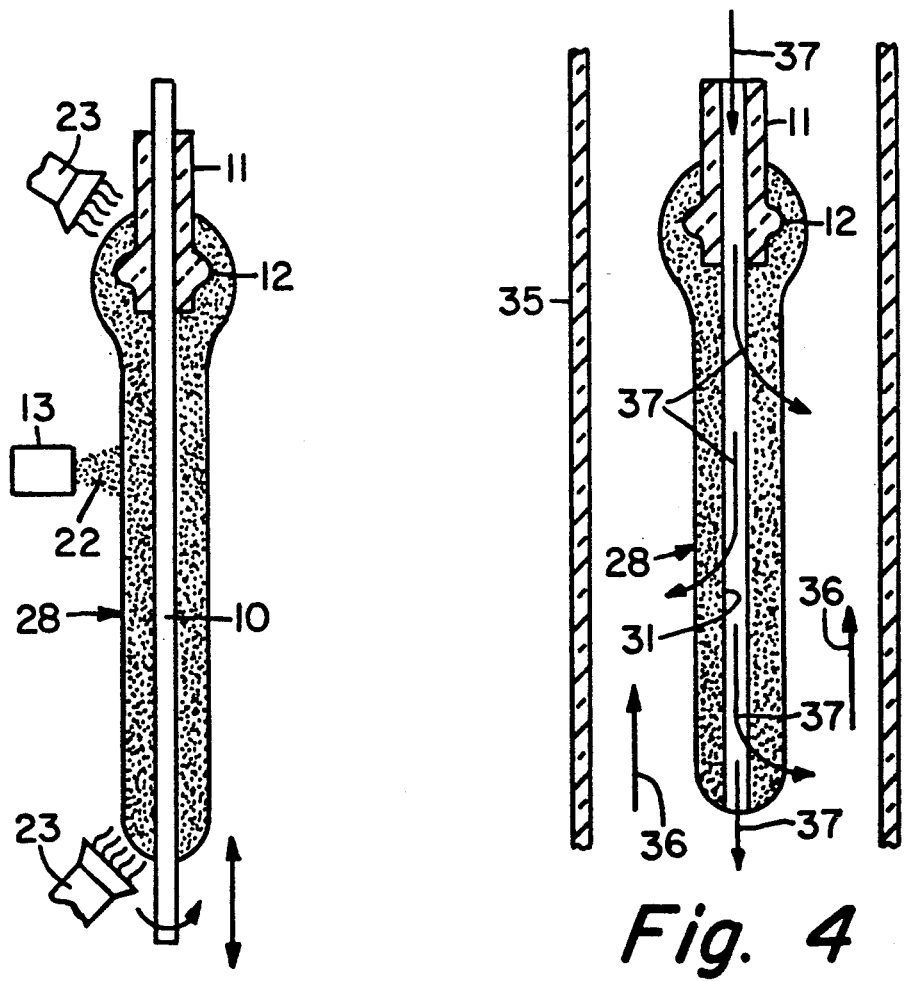
Fig. 3
Fig. 4

METHOD OF MAKING FLUORINE/BORON DOPED SILICA TUBES

BACKGROUND OF THE INVENTION

The present invention relates to the manufacture of glass articles having predetermined composition profiles, and more particularly to the manufacture of doped silica tubes having predetermined radial composition profiles of $B_2O_3$ and fluorine.

Glass tubes having predetermined radial composition profiles are utilized in the manufacture of various optical devices. For example, doped silica tubes having refractive indices lower than that of silica are used in the manufacture of a type of fiber optic coupler referred to as a multiclad coupler. Such couplers are formed by inserting into a glass tube at least a portion of each of a plurality of optical fibers so that the fiber portions occupy the midregion of the tube. The tube midregion is collapsed onto fibers, and the central portion of the midregion is stretched until a predetermined coupling occurs between the fibers. Couplers having various kinds of coupling characteristics, e.g. WDM, achromatic, and the like, have been made by this process. See, for example, U.S. Pat. Nos. 4,931,076 and 5,011,251.

The physical characteristics of the glass tube affect both the manufacturing process and the optical characteristics of the resultant coupler. Such physical characteristics include viscosity, refractive index and thermal coefficient of expansion (TCE).

In multiclad fiber optic couplers, the tube refractive index $n_3$ must be lower than the refractive index $n_2$ of the fiber cladding. Commercially available single-mode optical fibers usually have a value of $n_2$ that is equal to or near that of silica. If silica is employed as the base glass for the tube, a dopant is added thereto for the purpose of decreasing $n_3$ to a value lower than $n_2$. The refractive index of the tube relative to that of the cladding is represented by $\Delta_{2-3}$, the value of which is defined as $$\Delta_{2-3}=(n_2^2-n_3^2)/2n_2^2$$

The value of $\Delta_{2-3}$ for standard WDM couplers has usually been between 0.26% and 0.35%. During the manufacture of achromatic overclad couplers, process reproducibility is enhanced by employing preforms having $\Delta_{2-3}$ values above 0.35%. When employed in the manufacture of fiber optic couplers, the refractive index of that half of the tube having the smaller radius is more critical since it is adjacent to the optical fibers and therefore propagates the coupled signal in the coupling region.

The dopants $B_2O_3$ and fluorine have been employed to lower the refractive index of silica tubes, fluorine having the greater effect on refractive index. They also advantageously decrease the tube viscosity to a value lower than that of the coupler fibers, boron having the greater effect on viscosity. This enhances to a certain extent the collapsing of the tube onto the fibers; the tube glass flows around the fibers without distorting their shape. These dopants also affect the TCE of the tube, boron increasing the TCE relative to silica, while fluorine reduces the TCE relative to silica when used in concentrations needed for couplers. The TCE of the tube can affect the polarization sensitivity of the resultant coupler. The TCE of the tube is usually tailored to be compatible with that of the fiber cladding. For a specific coupler, the concentration of boron and fluorine in the glass tube are selected to provide the optimal combination of the above-discussed optical and mechanical characteristics.

Glass coupler tubes have been made by a flame oxidation process involving the following steps: (1) deposition of glass particles on a mandrel, (2) mandrel removal, and (3) consolidation of the resultant porous preform. That process has been used to make coupler tubes comprising $SiO_2$ doped with 1 to 12 wt. % $B_2O_3$, $SiO_2$ doped with 0.1 to approximately 2.5 wt. % fluorine, and $SiO_2$ doped with combinations of $B_2O_3$ and fluorine. To achieve the desired combination of physical properties needed for a particular coupler, a combination of both dopants is usually needed. The boron has conventionally been added to the glass particle stream during the particle deposition step. However, when the required amount of fluorine exceeds about 0.6 wt. % (0.2% $\Delta$), the fluorine cannot be incorporated into the preform during the particle deposition step since fluorine in the reactant vapor stream reacts with water in the air to form HF. Also, it has been found that the addition of a fluorine-containing compound to the reactant stream emitted by a flame hydrolysis burner tends to decrease the rate of deposition of glass particles collected on the mandrel. Fluorine has therefore been added to the glass during the consolidation step.

The standard process for producing coupler tubes containing both boron and fluorine is as follows. A porous preform having a uniform radial composition of $B_2O_3$-doped $SiO_2$ is formed on a mandrel by a process such as that disclosed in U.S. Pat. No. 4,165,223 and patents cited therein. The reactants, $SiCl_4$ and $BCl_3$ are supplied to a flame hydrolysis burner that directs a stream of $B_2O_3$-doped $SiO_2$ particles toward the mandrel. After a coating of sufficient thickness is built up, the mandrel is removed, and the resultant tubular porous preform is placed in a consolidation furnace. The preform is then doped with fluorine by flowing into the preform aperture a mixture of He and a source of fluorine such as $SiF_4$, $CF_4$ or the like. These fluorine-containing reactants are less corrosive than fluorine gas, and they effectively dissociate to active fluorine in the consolidation furnace. The radial composition profiles of the resultant tubes are typically as illustrated in FIG. 1. The low concentration of $B_2O_3$ near the tube aperture is the result of the reaction of the $B_2O_3$ in the porous preform with F in the gas mixture to form $BF_3$ which volatilizes and is exhausted from the furnace. This composition profile demonstrates the poor stability of the tube making process. Reproducibility of the process of manufacturing overclad couplers depends upon the uniformity of the radial composition profile of the overclad tube.

Attempts have been made to dope a pure silica porous preform with both boron and fluorine by flowing $BF_3$ into the preform aperture while the preform is heated in a consolidation furnace. The resultant radial composition profile is shown in FIG. 2. While the radial concentration of fluorine is relatively uniform, the radial concentration of $B_2O_3$ is unacceptable since it is much higher at small tube radii than at large tube radii.

SUMMARY OF THE INVENTION

It is therefore an object of the present invention to provide a method of making glass tubes containing $B_2O_3$ and fluorine. Another object is to provide a reproducible method of making such tubes so that particular radial composition profiles of $B_2O_3$ and fluorine are consistently achieved.

Briefly, the present invention relates to a method of forming a glass article. A $B_2O_3$-doped porous glass preform is initially formed. The preform is heated, and a fluorine-containing gas is flowed through its pores to dope it with fluorine. The porous preform is then consolidated to form a dense glass article doped with fluorine and $B_2O_3$. The method of the invention is characterized in that the step of flowing includes flowing through the preform pores a sufficient amount of $BF_3$ to inhibit the reaction of fluorine with $B_2O_3$ in the porous preform, since that reaction tends to form a $B_2O_3$-depleted region.

The porous preform preferably has an aperture, and the fluorine-containing gas is flowed between the aperture and the outer surface of the preform. In that embodiment wherein the fluorine-containing gas flows into the aperture, at least a portion of the gas flows through the pores to the outer surface whereby the reaction products can be flushed away by a muffle gas. The aperture-containing preform can be formed by depositing layers of $B_2O_3$-doped $SiO_2$ particles on the surface of a mandrel and removing the mandrel from the preform to form the aperture. Additional dopants such as germania can be incorporated in the glass particles to modify certain physical characteristics of the resultant preform.

When used as a tube for making overclad fiber optic couplers, that half of the dense glass tube having the smaller radius must have substantially uniform radial composition profiles of $B_2O_3$ and fluorine. Such tubes can be reproducibly formed by the present method. Indeed, the method of this invention routinely results in the formation of dense glass tubes having substantially uniform composition profiles of $B_2O_3$ and fluorine throughout the entire tube radius.

BRIEF DESCRIPTION OF THE DRAWINGS

FIGS. 1 and 2 are graphs illustrating radial variations in tube composition profile when conventional tube making methods are employed. In these figures, A and O represent the radii of the aperture and the outer surface, respectively.

FIG. 3 illustrates the application of a coating of glass particles to a mandrel.

FIG. 4 is a schematic representation of a consolidation furnace.

DESCRIPTION OF THE PREFERRED EMBODIMENTS

Figure 2:
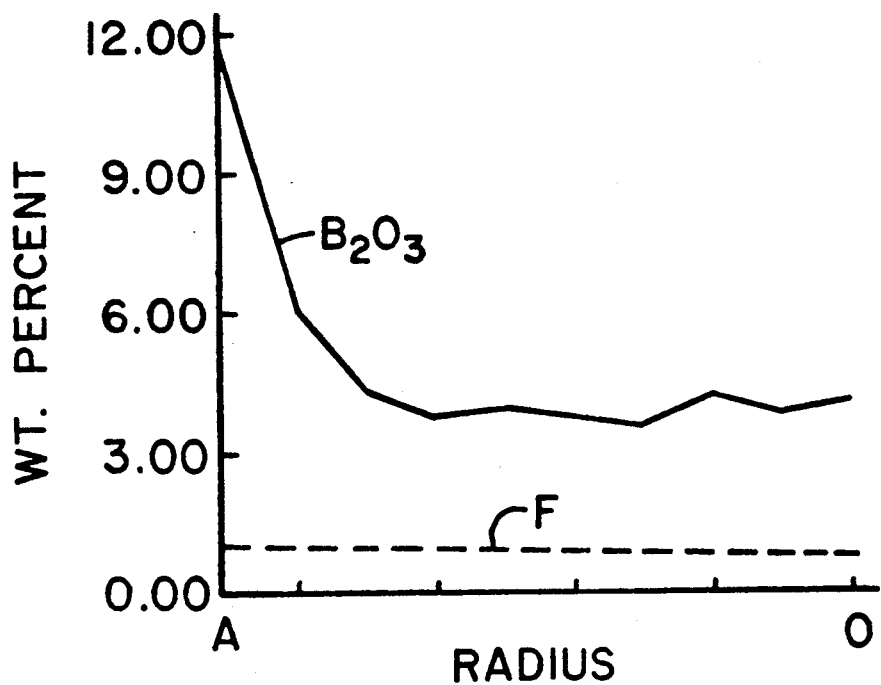

The present method pertains to a multistep doping process that results in the formation of a glass tube having desired boron and fluorine concentration profiles. Initially formed is a porous glass preform having a predetermined $B_2O_3$ concentration profile. While it is at an elevated temperature, the porous preform is subjected to a gas mixture containing a first source of fluorine for doping the preform and a sufficient amount of $BF_3$ to inhibit the reaction of fluorine in the gas stream with boron in the preform to form $BF_3$, a reaction that would result in the depletion of boron from the porous preform. For example, $BF_3$ can be supplied to the porous preform along with conventional fluorine compounds such as $SiF_4$, $CF_4$ or the like. Fluorine gas could be used, but it is very difficult to handle.

After the preform is doped with fluorine, it is heat treated to fuse or consolidate it into a non-porous glassy body. This step can be performed in a furnace separate from that in which the fluorine doping step occurred, but the fluorine doping and consolidation steps are preferably performed in a single furnace, complete consolidation occurring after the doping step. Suitable consolidation furnaces are disclosed in U.S. Pat. Nos. 4,165,223 and 4,741,748. The scanning consolidation furnace disclosed in U.S. Pat. No. 4,741,748 is advantageous in that one source of heat in the preform is generated by a coil that scans along the preform. A sharp hot zone can be generated by slowly traversing the coil along the preform; alternatively, the preform can be isothermally heated by rapidly reciprocating the coil. Moreover, the temperature of a scanning consolidation furnace is readily adjustable.

The preform preferably contains an aperture for the purpose of facilitating the flow of fluorine-containing gases through its pores. A tubular porous preform is conventionally formed by depositing particles on a mandrel and then removing the mandrel. The particle deposition step can take the form of any process whereby heated glass particles are deposited to form an aggregation or deposit of particles that adhere together to form a tubular, porous glass coating having interconnective pores.

A suitable process for forming a boron-doped tubular porous preform is shown in FIG. 3 wherein the large diameter end of a tapered mandrel 10 extends through a glass tube 11 having protrusions 12. Mandrel 10 is rotated and translated with respect to a burner 13 which may be of the type disclosed in U.S. Pat. No. 4,165,223. Reactant compounds emanate from the burner where they are oxidized in the flame to form glass particle stream 22 which is directed toward mandrel 10. Auxiliary burners 23 direct flames toward the ends of the porous glass preform during deposition; the use of auxiliary burners is taught in U.S. Pat. No. 4,810,276 (Gilliland). A porous preform 28 of desired thickness is formed by traversing the mandrel a number of times with respect to burner 13 to cause a build-up of a plurality of layers of glass particles.

Preform 28 is removed from the lathe, and the mandrel is removed through tube 11, thereby leaving a longitudinal aperture 31 in the porous preform. Protrusions 12 cause tube 11 to adhere to the preform; that tube supports the preform during subsequent processing.

Figure 5:
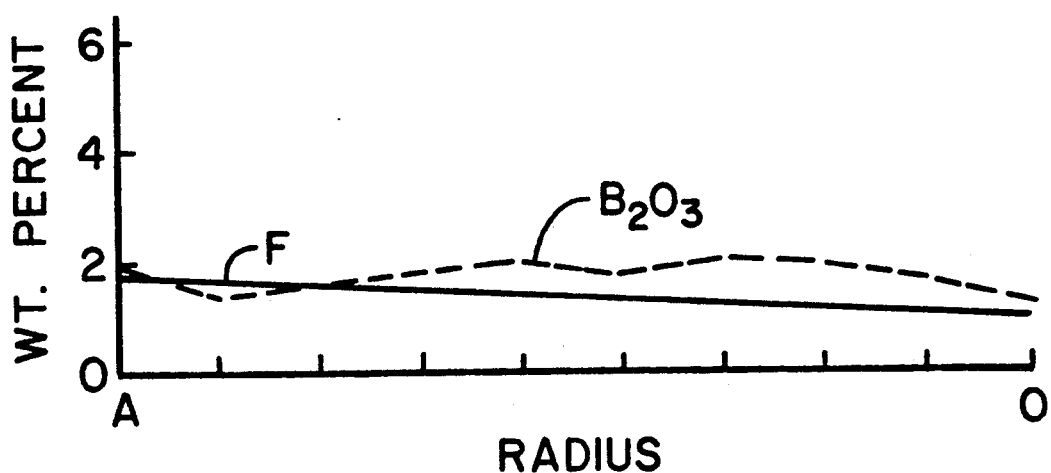
FIG. 5 is a graph illustrating the tube radial composition profile when the present method is used.

FIG. 4 shows the resultant tubular porous preform 28 suspended in the muffle 35 of a consolidation furnace where it is dried, doped and consolidated. Muffle gas represented by arrows 36 are fed to the bottom of muffle 35. Flowed through tube 11 and into aperture 31 is a gas mixture (arrows 37) comprising an inert gas such as helium and a source of an amount of fluorine sufficient to dope the preform. As described above, gas mixture 37 also contains an amount of $BF_3$ sufficient to prevent the $B_2O_3$ depletion shown in FIG. 1. Therefore, the radial $B_2O_3$ concentration remains quite uniform as shown in FIG. 5. The concentration profiles of FIG. 5 result from treating a porous $B_2O_3$-doped silica preform with $BF_3$ and $SiF_4$ at an elevated temperature.

The concentration of $B_2O_3$ and fluorine in the resultant glass tube are determined by controlling the amount of $B_2O_3$ deposited during the particle deposition step and by controlling the concentration and flow rate of fluorine-containing gas used in the doping step. Other factors that affect the concentrations of each of these dopants are preform density, time and temperature of the doping step, and the flow rate of other gases such as oxygen in the dopant gas stream.

For certain reasons, such as modification of viscosity and/or TCE without changing refractive index, it may be desirable to add another dopant such as germania to the glass particles during the formation of preform 28. For example, a porous $SiO_2$-$B_2O_3$-$GeO_2$ preform could be formed on a mandrel as described above, $GeCl_4$ being fed to the burner along with $SiCl_4$ and $BCl_3$.

The following specific example illustrates the manner in which the method of the present invention can be employed to produce doped silica tubes having substantially uniform radial composition profiles of $B_2O_3$ and fluorine. The term "substantially uniform" is used herein to mean that the radial concentration of a dopant does not vary from an average value by more than 0.5 wt. percent.

Alumina mandrel 10 (FIG. 3) was inserted into glass tube 11. The outside diameter of the mandrel tapered from 9.5 mm to 12.6 mm over its 107 cm length. The ends of mandrel 10 were mounted in a lathe where it was rotated and translated with respect to burner 13, which was positioned 17.2 cm from mandrel 10. Auxiliary burners 23 directed flames toward the ends of the porous glass preform during deposition. The burner traversed a 70 cm section of the mandrel in 30 seconds. An acetylene torch was initially supported on the burner, and the torch traversed the mandrel three times to deposit carbon particles on it to facilitate removal of the porous preform from the mandrel. Thereafter, layers of silica particles doped with $B_2O_3$ were deposited by flowing $SiCl_4$ and $BCl_3$ to burner 13 in accordance with the following program for 650 traverses of the burner with respect to the mandrel. The flow rate of $SiCl_4$ remained constant at 1.75 slpm during the first 100 burner traverses; it then linearly decreased from 1.75 slpm to 1.0 slpm from the 101st to the 650th traverse. The flow $BCl_3$ remained constant at 160 sccm for the first 200 traverses of the burner with respect to the mandrel; it then linearly increased from 160 sccm to 200 sccm from the 201st to the 650th traverse. The term "slpm" means standard liters per minute, and the term "sccm" means standard cubic centimeters per minute. The reactant vapors were premixed with oxygen before being supplied to burner 13. Particle deposition continued for 325 minutes; the preform was then cooled, and the mandrel was removed through tube 11. The resultant porous preform 28 was 75 cm long, 90 mm in diameter, and its average density was about 0.35 g./cm$^3$.

Preform 28 was then loaded into a scanning consolidation furnace (FIG. 4) where it was dried, doped and consolidated. During each of these steps, a muffle gas consisting of 20 slpm helium flowed upwardly from the bottom of the muffle.

During the drying step, a movable induction coil was reciprocated back and forth along the length of the preform at a rate of 1800 mm/minute to isothermally increase its temperature from room temperature to about 1025° C. A drying gas mixture consisting of 500 sccm oxygen, 70 sccm chlorine and 700 sccm helium flowed through tube 11 and into the axial aperture from which the mandrel had been removed. While the temperature remained at 1025° C., this gas mixture continued to flow for 20 minutes to dry the preform.

During the subsequent preform doping step, the induction coil continued to reciprocate at 1800 mm/minute to maintain the preform temperature at 1025° C. During this step, the duration of which was 20 minutes, a doping gas mixture consisting of 500 sccm oxygen, 70 sccm chlorine, 700 sccm helium, 50 sccm $BF_3$ and 200 sccm $SiF_4$ flowed into the axial aperture. The $SiF_4$ decomposed to form fluorine which diffused into and doped the $B_2O_3$-$SiO_2$ particles. The presence of $BF_3$ in the preform interstices prevented the depletion of $B_2O_3$ from the preform.

The porous preform was then consolidated to form a dense glass tube by traversing the coil upwardly along the preform at a rate of 12 mm/minute to generate in the preform a sharp hot zone, the maximum temperature of which was about 1440° C. The drying gas mixture continued to flow during the entire consolidation step.

Since the $B_2O_3$ was not depleted from the porous preform during the doping step, the resultant tube exhibited the composition profile shown in FIG. 5. The tube was stretched to decrease its diameter, and it was severed into individual capillary tubes, each having a length of 3.4 cm, a 2.65 mm outside diameter and a 270 $\mu$m longitudinal aperture diameter. Both ends of the aperture were flared outwardly by the method taught in European published application 0423999 (G. E. Berkey 19).

The aforementioned tubes were employed to make 1×2 fiber optic couplers in accordance with the method disclosed in U.S. Pat. No. 4,979,972, which is incorporated herein by reference. In accordance with that method, approximately 3.2 cm of coating is stripped from the central region of a 3 meter length of 125 $\mu$m diameter single-mode optical fiber (the first fiber) having a 250 $\mu$m diameter urethane acrylate coating. This fiber is threaded through the capillary tube until the stripped region is located just below the tube. A 6 cm long section of coating is removed from the end of a 1.5 meter length of a second fiber. The second fiber is severed, and its end is rounded in a flame, the uncoated length of fiber being about 2.9 cm. Both fibers are inserted into the capillary tube until the uncoated regions are centered in the aperture. The tube is evacuated, and its midregion is heated to collapse it onto the fibers. The center portion of the midregion of the resultant structure is stretched to provide the desired coupling ratio. After the coupler has cooled, a drop of adhesive is applied to each end of the capillary tube.

When an input signal is propagated in the first fiber at one end of the coupler, the resultant device couples approximately 50% of the signal to each of the two optical fibers extending from the opposite end.

This process typically produced 3 dB couplers that operated at 1310 nm. After the process was tuned, the couplers which were made thereby exhibited a median excess device loss was about 0.15 dB, and a median coupling ratio of 50.8. The lowest measured loss was 0.02 dB.

The use of the uniform composition tubes improved the reproducibility of the process of making fiber optic couplers. For example, the standard deviation of the coupling ratio was about 13% when the process employed tubes having composition gradients of the type shown in FIG. 1. The standard deviation of the coupling ratio decreased to about 5.5% when the process employed tubes having composition ratios of the type shown in FIG. 5.

We claim:

1. A method of forming a glass article comprising the steps of forming a $B_2O_3$-doped porous glass preform having interconnective pores, heating said preform, flowing through said pores at least two different fluorine-containing gases, one of said gases being a source of fluorine for doping said porous preform and a second of said gases being a sufficient amount of $BF_3$ to prevent fluorine from reacting with the $B_2O_3$ in said porous preform and forming a $B_2O_3$-depleted region therein, and consolidating said porous preform to form a dense glass article doped with fluorine and $B_2O_3$.

2. A method in accordance with claim 1 wherein the step of forming comprises forming a tubular glass article having an aperture, and the step of flowing said comprises flowing fluorine-containing gas between said aperture and the outer surface of said preform.

3. A method in accordance with claim 2 wherein the step of flowing said comprises flowing fluorine-containing gas into said aperture, at least a portion of said gas flowing through said pores to the outer surface of said preform.

4. A method in accordance with claim 3 wherein the step of forming comprises depositing layers of $B_2O_3$-doped $SiO_2$ particles on the surface of a mandrel to form a porous preform and removing said mandrel from said preform to form said aperture.

5. A method in accordance with claim 4 wherein the step of forming comprises depositing particles of $SiO_2$ doped with $B_2O_3$ and another dopant.

6. A method in accordance with claim 5 wherein the step of forming comprises depositing particles of $SiO_2$ doped with $B_2O_3$ and $GeO_2$.

7. A method in accordance with claim 1 wherein the step of forming comprises forming a tubular porous preform having a substantially uniform $B_2O_3$ composition throughout its radius, and the step of consolidating results in the formation of a dense glass tube in which that half having the smaller radius has substantially uniform radial composition profiles of $B_2O_3$ and fluorine.

8. A method in accordance with claim 1 wherein the step of forming comprises forming a tubular porous preform having a substantially uniform $B_2O_3$ composition throughout its radius, and the step of consolidating results in the formation of a dense glass tube having substantially uniform radial composition profiles of $B_2O_3$ and fluorine.

9. A method of forming a glass article comprising depositing on a cylindrical mandrel a coating of glass particles comprising $SiO_2$ and $B_2O_3$, said coating containing interconnective pores, removing said mandrel to form a porous glass preform having an axial aperture, inserting said preform into a consolidation furnace muffle, flowing upwardly through said muffle a muffle gas comprising an inert gas, flowing a fluorine-containing gas mixture into said aperture, at least a portion of said gas mixture flowing outwardly through said pores, said gas mixture comprising (a) a first, boron-free fluorine compound that decomposes to form fluorine which dopes said preform, and (b) a sufficient amount of $BF_3$ to prevent fluorine from reacting with the $B_2O_3$ in said porous preform and forming a $B_2O_3$-depleted region near the aperture surface, and heating said preform to a temperature within the consolidation temperature range for a time sufficient to cause said particles to fuse and form a dense glass tube.

10. A method in accordance with claim 9 wherein the step of depositing comprises depositing particles of $SiO_2$ doped with $B_2O_3$ and another dopant.

11. A method in accordance with claim 10 wherein the step of depositing comprises depositing particles of $SiO_2$ doped with $B_2O_3$ and $GeO_2$.

12. A method of forming a fiber optic coupler comprising depositing on a cylindrical mandrel a coating of glass particles comprising $SiO_2$ and $B_2O_3$, said coating containing interconnective pores, removing said mandrel to form a porous glass preform having an axial aperture, inserting said preform into a consolidation furnace muffle, flowing a fluorine-containing gas mixture into said aperture, at least a portion of said gas mixture flowing outwardly through said pores, said gas mixture comprising (a) a boron-free fluorine compound that decomposes to form fluorine which dopes said preform, and (b) $BF_3$, heating said preform to a temperature within the consolidation temperature range for a time sufficient to cause said particles to fuse and form a dense glass tube having first and second opposite end portions and a midregion, a longitudinal aperture extending from a first end of said tube to a second end thereof, disposing a plurality of optical fibers such that at least a part of each fiber extends into the longitudinal aperture of said glass tube, each of said fibers having a core and cladding, at least that part of each fiber that is located in said tube midregion having no coating thereon, each of said fibers extending beyond at least one end of said tube, collapsing said tube midregion onto said fibers, and stretching the central portion of said midregion.

13. A method in accordance with claim 9 wherein the step of forming comprises forming a tubular porous preform having a substantially uniform $B_2O_3$ composition throughout its radius, and step of consolidating results in the formation of a dense glass tube in which that half having the smaller radius has substantially uniform radial composition profiles of $B_2O_3$ and fluorine.

14. A method in accordance with claim 9 wherein the step of forming comprises forming a tubular porous preform having a substantially uniform $B_2O_3$ composition throughout its radius, and the step of consolidating results in the formation of a dense glass tube having substantially uniform radial composition profiles of $B_2O_3$ fluorine.

* * * * *